Patented Nov. 19, 1935

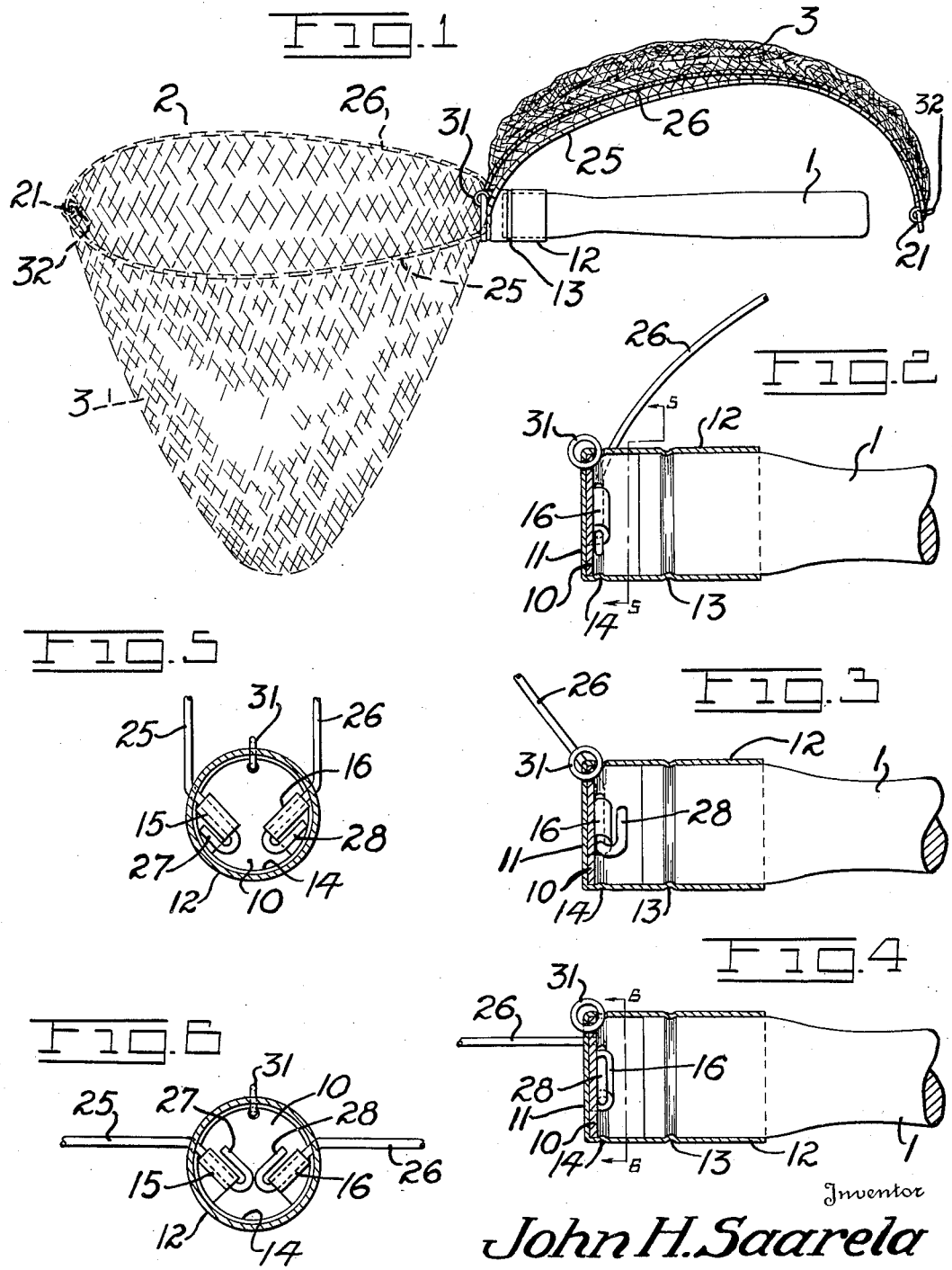

2,021,387

UNITED STATES PATENT OFFICE 2,021,387

LANDING NET

John H. Saarela, Seattle, Wash.

Application March 24, 1934, Serial No. 717,178

12 Claims. (Cl. 43—12)

My invention relates to landing nets for fishermen's use, and it is particularly an object of my invention to provide a landing net which can be folded into smaller compass than the ordinary net, or even such folding nets as I know of, and one which can be quickly reopened, even with one hand, while the other hand is engaged in handling a fish pole.

It is also an object to provide such a folding landing net which can be inexpensively manufactured, and which therefore can be sold at a price to compete favorably with non-folding nets.

My invention comprises the novel combination of elements as shown in the accompanying drawing, described in this specification, and as will be more particularly pointed out by the claims at the end of the specification.

In the accompanying drawing I have shown my invention embodied in an illustrative form, although various changes in detail and arrangement may be made without departing from the spirit of my invention.

Figure 1 is a perspective view of my invention, showing, in full lines, the net in its folded position, and in dotted lines the open position of the net.

Figure 2 is a longitudinal section through the end of the handle, showing the net in its closed position; Figure 3 is a similar view, showing the net part way open, and Figure 4 is a similar view showing the net in open position.

Figure 5 is a section on the line 5—5 of Figure 2, and Figure 6 is a section on the line 6—6 of Figure 4.

The handle 1 may be of any suitable material and of any length desired, or it may be an extension handle. These considerations are immaterial in so far as concerns the folding of the net. However, for a reason which will be clear hereafter I prefer to employ a ferrule or cap 12 which in effect comprises a part of the handle, though preferably it is crimped or otherwise secured in place on one end of the handle, as indicated at 13, with its closed end or bottom 11 spaced somewhat from the end of the handle proper. Also I prefer to employ an inserted plate 10 crimped in place or otherwise held, as indicated at 14. Thus the ferrule 12 and the plate 10 constitute a part of the handle, but are made separate for convenience of manufacture and assembly.

This composite handle has two pivot supports formed at 15 and 16. These may be formed by cutting and rolling a portion of the plate 10, or in any other suitable manner, but preferably are formed on the plate 10, though in effect they are supported from the handle. Within these pivot supports are received the ends of two wires 25 and 26, respectively. The pivot supports 15 and 16 are disposed at right angles to each other, thus defining a plane which extends transversely of the handle. To limit pivoting movement of the wires in their respective pivot supports the ends of the wires may be turned up as indicated at 27 and 28, so that in one position, as shown in Figures 4 and 6, the bent fingers 27 and 28 rest against the surface of the plate 10, and prevent further movement in this direction. However, the wires can pivot within the respective pivot supports through about 180 degrees, bringing the fingers through the position shown in Figure 3 to the position shown in Figures 2 and 5. Here they lie in registry with the cutout portions from which were formed the pivot supports 15 and 16, hence they do not definitely and positively stop further rotation of the wires, but tend to do so. The wires, it will be noted, project into the ferrule 12 through suitable holes provided for the purpose.

The free or outer ends of these wires 25 and 26 are suitably connected and shaped to complete a loop generally designated by the numeral 2. Thus, for example their ends may be formed with loops indicated at 21, thus securing together the free ends of these loop members 25 and 26 to form a loop, which may be circular, egg-shaped, or somewhat elongated, as may be preferred.

The loop members 25, 26 should be of spring material permitting some considerable flexibility. Figures 1 and 2 illustrate the closed position, as does Figure 5, and in this position the wires 25 and 26 lie close alongside each other with their profiles in coincident relation, and generally alongside the handle 1. From this position they may be swung over, the ends of the wires turning in the respective pivot supports 15 and 16, and the wires flexing until they have been turned through approximately 180°, whereupon the wires will assume the position shown in Figures 4 and 6. Engagement of the fingers 27 and 28 with the handle prevents further movement of the wires, stiffens the loop thus formed, and assists it in supporting its own weight and the weight of the fish landed therein. When the net is no longer needed the wires may be again pivoted in their respective pivot bearings, to swing with respect to each other about a chord of the frame, in the form shown the particular chord being a diameter, from the dotted line position of Figure 1 back to the full line position, and the net can then be placed in a pocket, hung on the belt or otherwise disposed of. When it is desired to open it, it is only necessary to grasp the handle 1 and to flip over the wires from the folded position to the open position. This can readily be done with one hand, the spring action of the wires serving to complete the opening after it has passed a given point, approximately to the position of Figure 3.

As will be obvious, a net 3 of suitable shape is threaded upon the loop 2, and in order to prevent its shifting around or along the loop members a ring 31 may be received in the ferrule 12 to engage the upper edge of the net, and a similar ring 32 may be employed at the hinge joint 21 between the two loop members.

What I claim as my invention is:

1. A landing net comprising, in combination, a handle, two pivot supports thereon, disposed in a plane transversely of the handle, and at right angles in such plane, two spring wires each pivotally received by one end in the respective pivot supports, means associated with the wires to limit their pivotal movement in one direction, said wires being pivotally connected by their outer ends, to form a loop, and a net supported from the loop thus formed, and said wires being movable from an open position, wherein they define a loop and the limit of their pivotal movement has been reached, to a closed position, wherein they lie adjacent to each other and the handle.

2. A landing net as in claim 1, including a plate whereon are formed the pivotal supports referred to, a ferrule in the end of which said plate is received, and which is secured upon the end of said handle.

3. A landing net comprising a handle and a plurality of arcuate loop-forming elements secured thereto, and movable relatively to each other and to the handle from an open position, wherein they form an open loop at the end of the handle, into closed position, wherein the individual members lie adjacent to each other with their profiles coinciding, and a net supported from said loop-forming members.

4. A landing net comprising, in combination, a handle, loop-forming members cooperating, in operative position, to form a frame, and means interconnecting said members and the handle to guide the members for movement into closed position, wherein each member lies in a plane substantially normal to the plane of the frame formed by the members in operative position.

5. A landing net comprising, in combination, two complemental loop-forming members, hinge means interconnecting two ends of said members, a handle, means on said handle, diametrically opposite to said hinge means, for receiving the other two ends of said members, said second means guiding said members for swinging movement, in collapsing the frame, about a line extending between said two means, and further guiding said hinge means for rotation relative to said handle about said second means, and a net depending from said members.

6. A landing net comprising, in combination, a handle, two pivot supports thereon, disposed in a plane transversely of the handle, and at right angles in such plane, two spring members each pivotally received by one end in the respective pivot supports, and cooperating with the end of the handle to limit their pivotal movement in one direction, said members being pivotally connected to each other by their outer ends, to form a loop, and a net supported from the loop thus formed, and said members being movable from an open position, wherein they define a loop and the limit of their pivotal movement has been reached, to a closed position, wherein they lie adjacent to each other and the handle.

7. A landing net as in claim 6, each member having limiting means comprising a finger extending angularly therefrom adjacent its pivotal support, and stop means on the handle to engage the finger of each member when swung to closed position, thereby to prevent further pivotal movement of each member, both relative to the handle and to the other member.

8. A landing net frame comprising, in combination, a handle, two complemental loop-forming members supported therefrom, and means interconnecting said two members for swinging of each with respect to the other about a chord of the loop formed thereby when the members are disposed in loop-forming position.

9. A landing net comprising, in combination, two members adapted to form a loop, a handle, and means interconnecting said two members and said handle, and guiding said two members for movement relative to each other and to the handle between an operative position, wherein said two members form a loop with said handle extending radially outward therefrom, and a closed position wherein said members lie generally alongside said handle and the members and handle all lie within a compass less than the area of the loop formed by said members in operative position.

10. A landing net comprising, in combination, two loop-forming members, means interconnecting said two members at one end, a handle, and two pivotal supports thereon disposed with their axes substantially at right angles and lying in a plane extending transversely of the handle, and each support receiving the other end of one of said two loop-forming members, to guide the same for pivotal movement from operative loop-forming position into closed position wherein said members lie adjacent to each other and the handle.

11. A landing net as in claim 10, the two loop-forming members being made of spring material, and being directly and pivotally joined to each other at their ends distant from the pivotally supported ends.

12. The combination of claim 10, and stop means to limit operation of the loop-forming members to movement between operative and closed positions.

JOHN H. SAARELA.